United States Patent [19]

Blazer

[11] Patent Number: 5,549,343
[45] Date of Patent: Aug. 27, 1996

[54] TRAIN TIRE PROFILE

[76] Inventor: Dorman S. Blazer, 7700 SE. Mitchell St., Portland, Oreg. 97206-4248

[21] Appl. No.: 288,942

[22] Filed: Aug. 10, 1994

[51] Int. Cl.$^6$ .................................................. B60B 19/02
[52] U.S. Cl. .......................................... 295/34; 295/31.1
[58] Field of Search ................................ 295/1, 31.1, 34, 295/7

[56] References Cited

U.S. PATENT DOCUMENTS

| | | | |
|---|---|---|---|
| 994,350 | 6/1911 | Vial . | |
| 1,293,628 | 4/1918 | Coda . | |
| 1,420,389 | 6/1922 | Scott . | |
| 1,783,705 | 12/1930 | Emerson . | |
| 2,056,729 | 10/1936 | Leisner et al. | 295/34 X |
| 2,560,729 | 7/1951 | Lynn | 56/27.5 |
| 4,294,482 | 10/1981 | Scheffel et al. | 295/34 |
| 4,355,578 | 10/1982 | Raquet | 104/1 A |
| 4,431,227 | 2/1984 | Howell | 295/33 |
| 5,295,624 | 3/1994 | Ziethen | 238/125 |

FOREIGN PATENT DOCUMENTS

| | | | |
|---|---|---|---|
| 0320616 | 6/1989 | European Pat. Off. | 295/1 |
| 1930543 | 12/1970 | Germany | 295/34 |
| 3204302 | 9/1991 | Japan | 295/34 |
| 1440754 | 11/1988 | U.S.S.R. | 295/1 |

OTHER PUBLICATIONS

J. L. Koffman, "British Rail Adopt New Tire Profiles, Traction & Rolling Stock Engineer", Aug. 1970, pp. 363–365.
Rorres, C. and Anton, H., *Applications of Linear Algebra*, (1984), pp. 4–6;.
Friedberg, S. and Insel, A., *Introduction to Linear Algebra with Applications*, (1986), pp. 31, 32, 48, 49, 226–234.
Shenk, A., *Calculus and Analytic Geometry*, (1977), p. 416 subject LoRAN.
Stone, D. and Leary J., *Railway Age*, Feb. (1992), "Reinventing The Wheel".
McLachlan, P. Eng., *Rail Profiles Can make A Difference*, a paper presented to: American Public Transit Association (1992) Rapid Transit Conference, Los Angeles, Cal, Jun. 16, 1992.
Hay, William W., *Railroad Engineering*, vol. 1, pp. 47–65.
Thomas and Finney, *Calculus and Analytic Geometry*, 5th Ed, (1978), pp. 494–496, 7th Ed, pp. 559–60; subject is effect of curvature on periodicity per Huygen and his clock.
Elsgolts, L., *Differential Equations and Calculus of Variations*, Mir Publishers, Moscow, pp. 244–247, subject is stability under constantly operating perturbations.
Mayr, Otto, *The Origins of Feedback Control*, (1970), history.
Kellogg, Dimon Oliver, *Foundations of Potential*, (1953).
Leary, John F., Elkins, John A., *Computer Solutions to Wheel/Rail Interaction Problems*, presented at APTA Jun. 13–17, (1992), flange pressure and other subjects.
Murphy, Gordon John, *Basic Automatic Control Theory*, (1957), pp. 1–15, 30, 31.
Pitman, R. J. G., *Automatic Control Systems Explained*, (1966), good basic mechanical explanation of feedback theory particularly chapter "Inertia and Friction in Control Systems".
Ditto, William L. and Pecora, Louis M., *Scientific American*, Aug. (1993), Vol 269, No. 2, "Mastering Chaos".

(List continued on next page.)

*Primary Examiner*—Russell D. Stormer
*Attorney, Agent, or Firm*—Marger, Johnson, McCollom & Stolowitz PC

[57] ABSTRACT

A section of a train wheel tread is formed into a continuous hyperbolic curve to respond asymptotically to changes in the path of a rail, thus, dampening lateral oscillation of the train wheels back and forth across rail. The hyperbolic curve at a minimum extends from a taping line to a wheel lift point. However, for further dampening effects the hyperbolic curve is extended from a fillet section across the taping line toward the field side of the wheel. Two tires having the same hyperbolic profile work in conjunction as a feedback system to dampen lateral oscillation while at the same time saving energy, reducing tire and rail wear.

19 Claims, 7 Drawing Sheets

OTHER PUBLICATIONS

Traub, Joseph F., Wozniakowski, Henryk, *Scientific American*, Jan. (1994), "Breaking Intractability".

Schroeder, M. R., *Fractals, Chaos, Power Laws: Minutes From an Infinite Universe*, (1991).

Dorf, Richard C., *Modern Control Systems*, (1974) pp. 129–131, concept of stability.

Magid, Andy R., *Applied Matrix Models: a second course in Linear Algebra with Computer Applications*; (1985), a method of handling over determined systems.

Law, E. H, *Transactions of the ASME Journal of Engineering for Industry*, Nov., (1974) pp. 1168–1174, "Nonlinear Wheelset Dynamic to Random Lateral Rail Irregularities".

Hedrick, J. Karl, Arslan, A. V., *Transactions of the ASME Journal of Dynamic Systems, Measurement, and Control*, Sep. (1979), vol. 101, pp. 230–237. "Nonlinear Analysis of Rail Vehicle Forced Lateral Response and Stability".

Fries, R. H., Cooperrider, N. K., Law, E. H., *Transactions of the ASME Journal of Dynamic Systems, Measurement, and Control*, Sep., (1981), vol. 103, pp. 201–210; "Experimental Investigation of Freight Car Lateral Dynamics".

Fries, R. H., Cooperrider, N. K., Law E. H., *Transactions of the ASME Journal of Dynamic Systems, Measurement, and Control*, Dec., (1978), vol. 100, pp. 238–251.

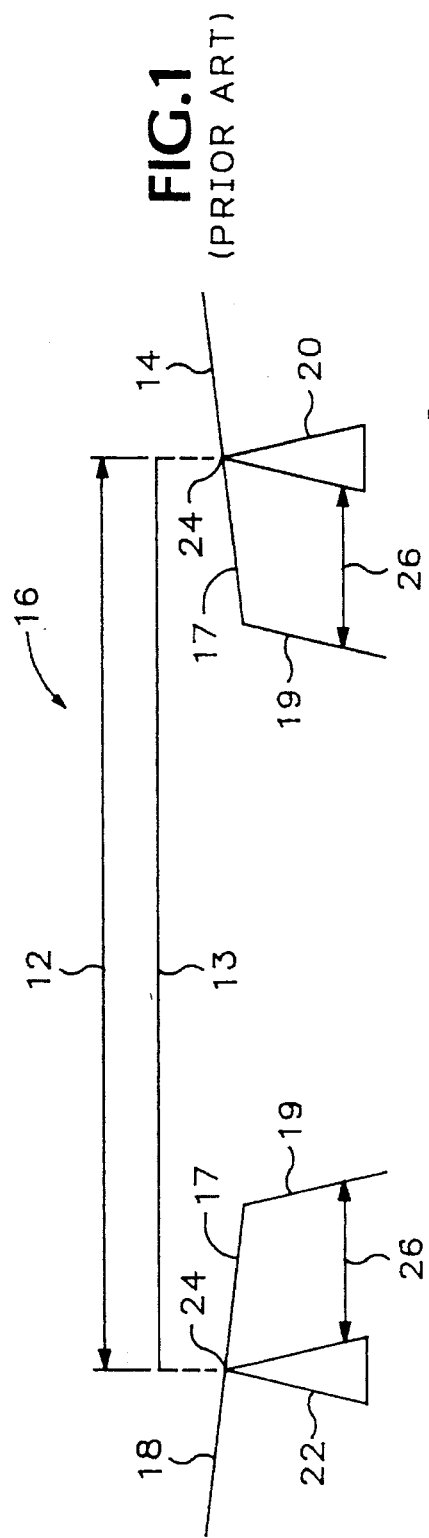
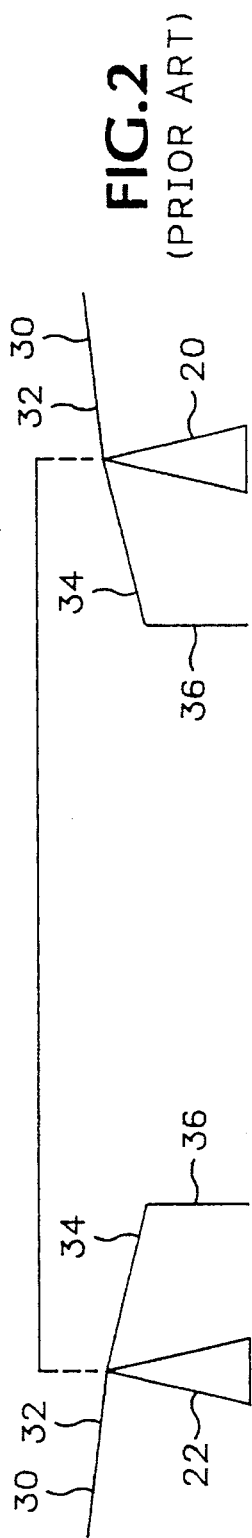
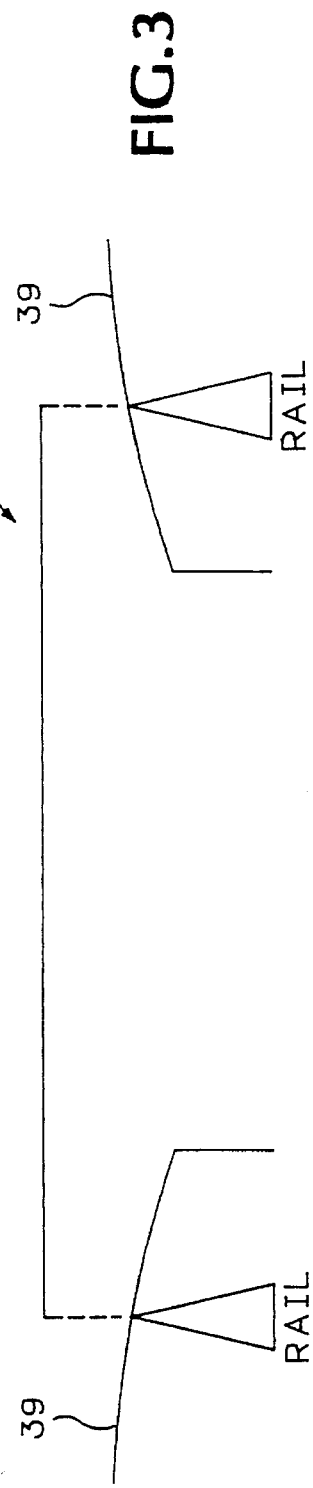

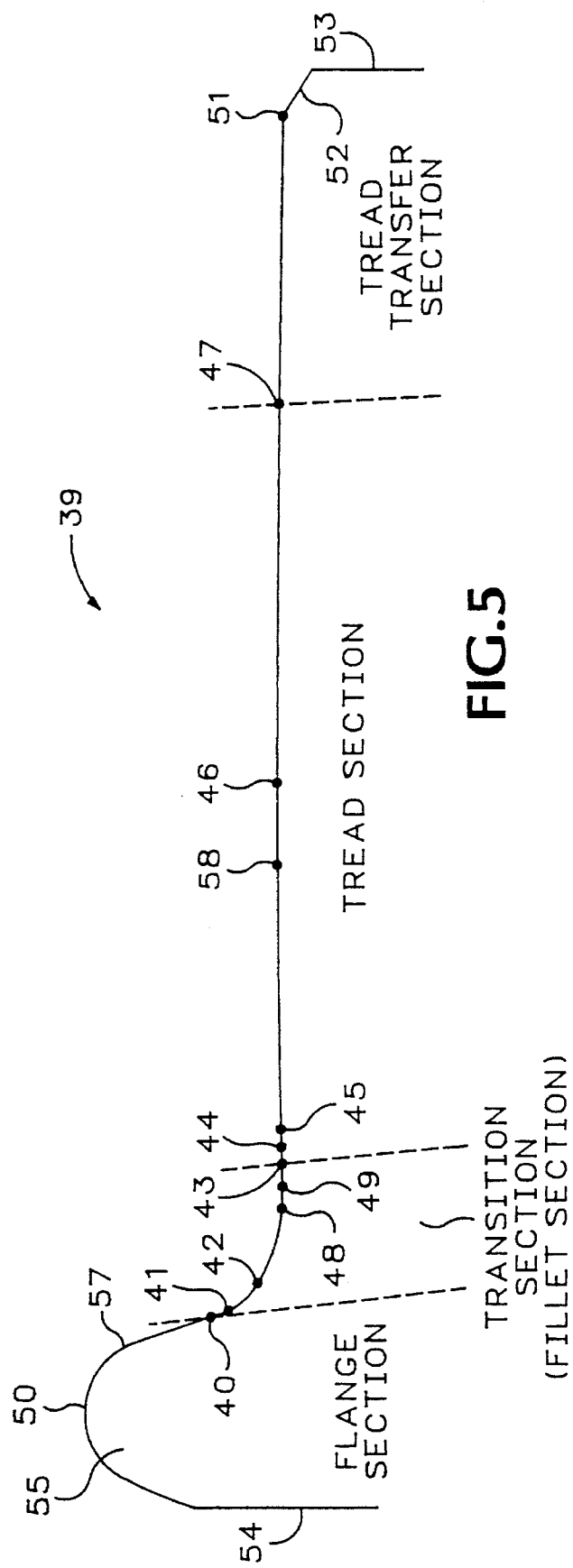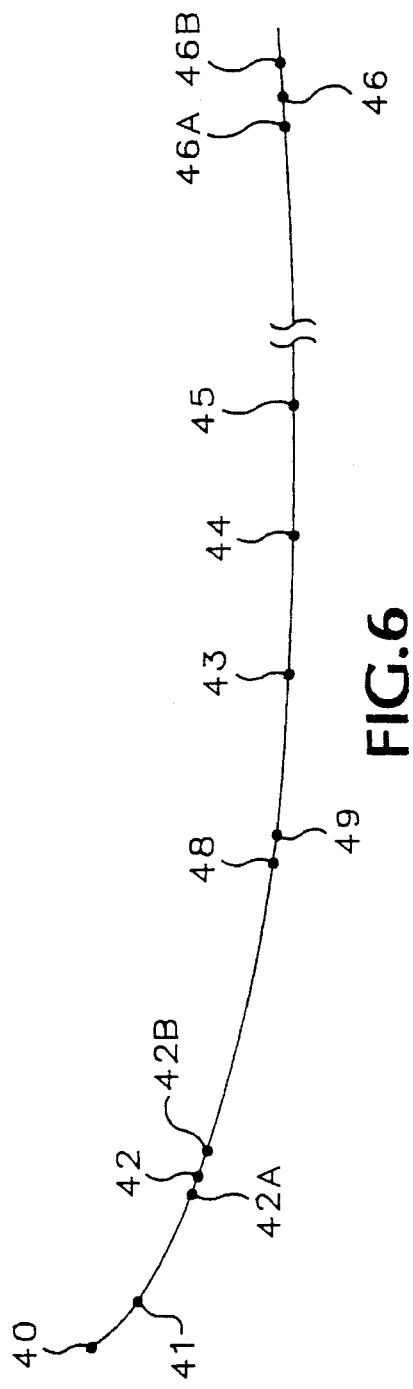

TRAIN TIRE PROFILE

BACKGROUND OF THE INVENTION

This invention relates generally to trains and train wheels and more particularly to a novel tire profile that improves train stability and energy efficiency.

Train tire profile includes several sections. A flange section protrudes downward from the side of the train wheel and extends over the lateral side of a train track. A fillet extends upward along a field side of the flange providing transition to a straight conical wheel tread section. The wheel tread section serves as the major load bearing surface that supports the train wheels on a train track. The art uses tread profile of two opposing tires each on one of two rails to steer. Two opposing tires are a wheelset. The flange provides steering when rail curve exceeds capability of treads to steer without flange contact.

Two main factors must be considered when designing tire profiles for use with railed devices. The first is the dynamic stability of the vehicle at various speeds throughout its operating speed range. When in transit, a train experiences lateral oscillations known as "hunting". Wheel hunting results in the wheels oscillating laterally back and forth between the wheel flanges. The maximum speed or critical speed of the train is determined by the onset of unstable, undesirable wheelset hunting. For example, if the train goes too fast, the force of the lateral oscillations will overcome the flange barrier and cause the train to derail. Hunting is caused by the dynamics between the wheel tread profile and the rail. Increasing the slope of the wheel tread too fast toward flange increases forces causing hunting and, therefore, lowers the critical speed of the vehicle. Decreasing slope of wheel tread toward flange decreases steering forces, also lowering the critical hunting speed. This is the measure of mismatch. These limits define critical mismatch threshold.

A second factor involved with train stability is the ability of the vehicle to negotiate track curves. This curving ability is determined primarily by the ability of the opposing tires of wheelsets to follow the track curves. Optimally, the wheelsets should perform a purely rolling motion in the track curves without any contact between the wheel flanges and the rails. This requires steering forces to be generated by the sloped wheel tread independently of the wheel flange permitting the wheelset to yaw or rotate about a vertical axis which may be through its center. Oscillation of steering forces happen around vertical axis through its center of gravity (mass). This oscillation is a metric space. The oscillation of wheelset results in hunting. The steering forces move the train wheelsets into a more radial position (axle 82 FIG. 17) with respect to the track curves, thus, increasing train stability around curves.

A wheelset includes two opposite wheels that may be joined together by an axle. With a conical (straight taper) wheel tread the conicity remains virtually constant with lateral deflection of a wheelset relative to the track. That is, straight taper wheel treads have a constant slope. In other words, the conicity of each wheel remains the same irrespective of whether the wheelset runs centrally on the track or is deflected closer to one rail. Increasing the conicity of the wheel tread improves the steering ability of the wheelsets because of the increased steering force. However, increased conicity also increases the oscillation of the wheelset. Oscillation of wheelset results in hunting. Therefore, with regard to the conicity of wheel treads, there is a conflict between the requirement for hunting stability and increased vehicle speed and for good curving ability of the wheelsets.

U.S. Pat. No. 4,294,482 to Scheffel et al., discusses a profiled wheel tread that is made up of a combination of discrete circle and line segments. In the art the term "profiled" is used in relation to wheels having a curved tread section and distinguishes such wheels from conventional wheels having a straight conical (linear sloped) tread section. The profiled tread in Scheffel et. al., utilizes multiple discrete curve sections each having a separate radius that are combined to form a non-continuous curve. The term conicity is imprecise. The curve radii of the profile increase from taping line to the flange. This is thought to reduce conicity of the profile. It reduces conicity of profile when compared to profile of constant radius between taping line and fillet. Thus, the tire tread conicity has essentially a "droop" characteristic with increasing lateral deflection toward the flange compared to tread of constant radius. A train profile with multiple curve discontinuities and a "drooping" characteristic will initiate vibration between the wheelset and the train. Because the wheel tread also has relatively high conicity of tread slope change at the taping line, the tire is also more likely to hunt in relation to a straight taper. The minimum radius is at the taping line with larger radii toward fillet.

U.S. Pat. No. 5,295,624 to Ziethen et al. discusses means for varying the train rail profile to extend wheel wear and track durability. Ziethen et al., however, does not suggest means for reducing vibration and hunting in train treads. The definition of concern is that radius of tire tread is larger than radius of contacted rail. Also definition of concern is that there would not be two point contact between tire profile and rail. In FIG. 1 of Ziethen the lower continuous line (10) looks like it goes horizontal at coordinate origin [line 57 col 3] thus indicating a discrete radius of tread in accordance with that invention to the extent shown in their figure. This meets their requirement that tread radius is larger than contacted rail radius. Therefore, in a manner similar to Scheffel, FIG. 1 in Ziethen suggests using discrete change of tread section. Therefore, the Ziethen tread profile begins with a linear wheel tread and then abruptly changes to a radius in tread toward the fillet. The abrupt change in curvature in the tread section induces vibration and increases wheel resistance when the wheelset is laterally displaced on standard rail. This is not an absorptive barrier. Thus, the profile in Ziethen is not energy efficient and further does not provide additional steering forces different than prior art.

U.S. Pat. No. 1,298,628 to Coda describes a wheel profile including two separate sections that intersect at the taping line. The profile is a wheel tread having a conical (linear) outer portion tangent to a portion of continually increasing conicity to the wheel flange. U.S. Pat. No. 1,783,705 to Emerson shows a substantially linear tread profile that is profiled to match the curvature of a corresponding inner rounded corner of railhead. U.S. Pat. No. 994,350 to Vial, discusses a wheel having both a concave throat section and a separate convex tread section toward the fillet. Coda, Emerson and Vial, similar to the other patents previously listed, have either straight conical tread profiles or discontinuous tread that include a combination of different sections each having a different curvature formula. Tread profiles with elliptical or circular profiles include a harmonic frequency that causes periodic oscillation under certain track conditions. Thus, the problems of vibration, limited steering forces and hunting still exist.

Another problem with train tires is excessive wear both at the tread and flange. For example, linear tread profiles typically exhibit excessive wear next to the flange. Contrary to normal expectations, an increase in the contact area between the wheel and the rail does not necessarily decrease tread wear. Research has now shown that the rate of wear of the tread, in fact, increases when the shape of the tread approaches the shape of the rail head. This is because the wheel-tread/rail-head contact area increases to such an extent that there is a disadvantageous increase of the creep forces or slip of the wheel on the rail. The increased creep forces significantly increase the wear rate offsetting reduction in wear rate due to increased contact area. Thus, it is predicted that tread profiles that match the railhead, such as Ziethen, have a tendency to wear faster according to Scheffel.

Many standard train tire treads have linear profiles but, due to wear, rapidly become nonlinear. This small amount of nonlinear wear causes hunting as described by John F. Leary in paper entitled America Adopts Worn Wheel Profiles in Railway Gazette International, July 1990. Additional information is provided by John F. Leary, Stephen N. Handle and Britto Rajkumar in a paper entitled: "Development of Freight Car Wheel Profiles—A Case Study", in Wear, 144 (1991) pages 353–362, Association of American Railroads, Pueblo, Colo. The, nonlinear circle segments used for defining the tire profiles in both Scheffel and Ziethen also suggest profiling the tire tread into nonlinear shapes. Thus, present nonlinear profiled tire treads have increased steering forces that induce hunting.

Accordingly, a need remains for a train tire profile that is both resistant to hunting and vibration, provides steering forces during turns and is energy efficient.

SUMMARY OF THE INVENTION

It is, therefore, an object of the invention to increase the stability of trains while traveling along rails.

Another object of the invention is to the increase energy efficiency of trains while at the same time increasing the maximum critical speed that the trains can safely travel on a rail.

A further object of the invention is to increase the standardization of profiled tire tread designs that have both superior curving ability and that are also resistant to hunting.

The present invention takes into account feedback theory to develop a tread profile that is resistant to hunting, provides added steering forces through curved rail and is energy efficient. Rail technology does not presently use feedback theory to effectively model and control the interaction between train tires and rails. Correspondingly, present wheel profiles do not maximize train performance. Feedback theory and how it is used in control systems is discussed by Sandeep in article entitled "Deterministic Controllers for a Class of Mismatched Systems", Journal of Dynamic Systems, Measurement and Control; March 1994 Vol. 116 pp 17, and is herein incorporated by reference. The important concepts are measure of mismatch and critical mismatch threshold.

Elements of control system theory are discussed in many different texts under different labels. Ferenc Szidarovsky and A. Terry Bahill discuses elements of Lyapunov stability theory in book Linear Systems Theory and is herein incorporated by reference. The feedback system must be a continuous mathematical function. There must be a unique global minimum at average position within feedback system. And finally for any state trajectory the function of that perturbed trajectory must be decreasing with time. These design criteria are taken into account when designing the tread profile of the present invention to control energy stored in the train tire. A tire profile is correspondingly designed essentially as a feedback system operating between two opposite tires in a train wheelset. The result is a tread profile that increases train wheel performance by reducing hunting and vibration while at the same time increasing steering capacity and energy efficiency.

The wheel profile effectively incorporates an absorptive barrier [Gelbaum] that redistributes wear away from the flanges. The absorptive barrier provides an asymmetric response in relation to different lateral displacements of the wheelset that effectively maintains the wheelset at a centered position. The tread profile exhibits slight resistive forces when the wheel moves laterally across the rail in locations relatively close to a center wheel position. However, wheel pair exert significantly increased resistive forces when the wheels are moved across the rail to location significantly far from the centered wheel position. Thus, when the wheelset is off center, a net force is exerted on the train truck wheelset in an asymptotical manner in the direction of the centered position.

Specifically, the invention incorporates a hyperbolic/asymptotic tread profile on the tread section of each wheel in a wheelset. The profile decreases asymptotically in amplitude as it extends further from the flange. The asymptotic profile effectively dampens lateral vibrations in the wheelset in a manner similar to an asymptotically decreasing response in an electronic feedback system. The profile of the wheel exhibits a "continuous" asymptotic curve over substantially the entire tread section of the wheel to reduce vibration and ensure a proper wheel/rail feedback response. The asymptotic profiles from each wheel in the wheelset, when combined, form a catenary that maintains the wheelset in a centered position. A load supported by the wheelset will exhibit a local minimal when the wheelset is in a centered position. Thus, vertical gravitational forces tend to maintain the centered position. The hyperbolic profile provides a phase lag in the wheelset when navigating rail curves. Thus, the tire treads of opposite tires are an absorptive barrier that effectively absorb and dampen lateral oscillations. Lateral oscillations increase tire wear and use energy to wear tires thus reducing energy efficiency. The hyperbolic profile is incorporated into either just the tread section of the wheel or extended in a continuous curve from the tread section up into the fillet section. Thus, extreme off-center displacements of the wheelset still reside within the asymptotical feedback system of the wheel profile.

The asymptotic tire profile is derived using a matrix algebraic relationship between various selected points on the wheel to generate a reliable and consistent profiled shape. The selection of certain reference points on the tread ensures smooth transitions between different wheel sections, in turn reducing vibration and ensuring proper wheel response in relation to varying rail radii.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a schematic diagram representing a cross section of a prior art linear tread profile for a wheelset.

FIG. 2 shows a schematic diagram of a tread profile with two linear slopes.

FIG. 3 shows a schematic diagram of a wheel profile according to the invention.

FIG. 5 is an expanded cross section of the asymptotic tread profile shown in FIG. 3.

FIG. 6 is an expanded cross section of the profile shown in FIG. 5 with additional reference points.

DETAILED DESCRIPTION

THEORY

Figure 4:
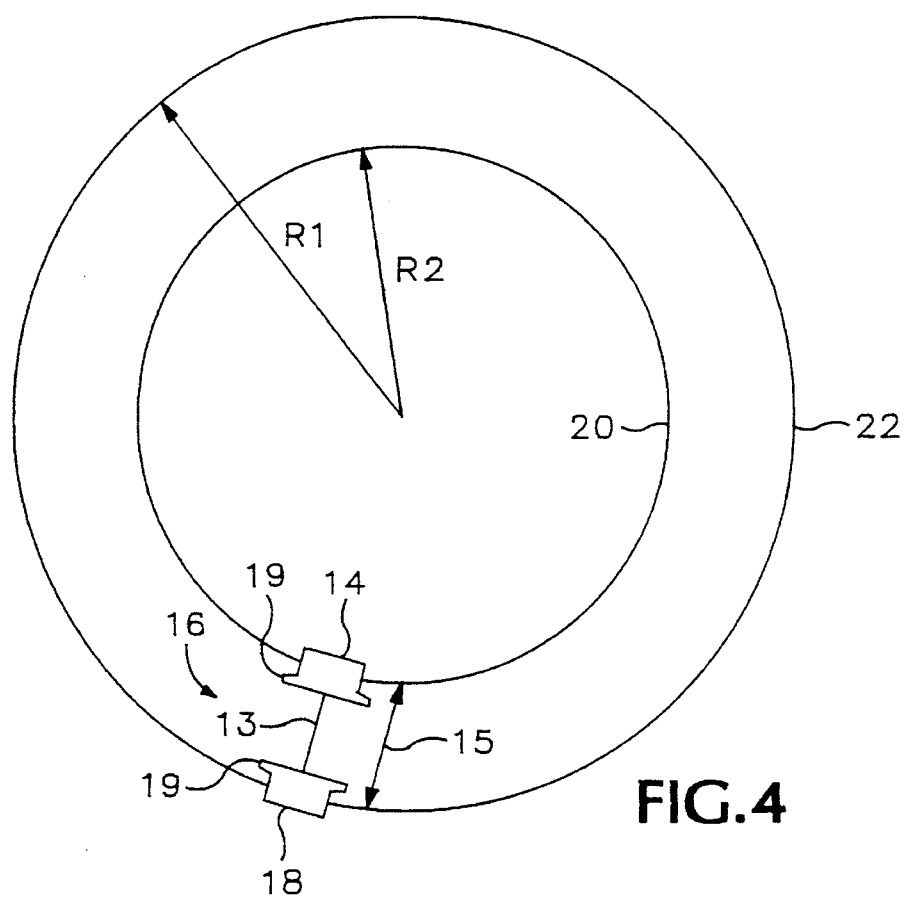
FIG. 4 is a schematic top view of the standard wheelset in FIG. 1 shown on rail curve.

The logical and mathematical basis for the present invention is based on classical mathematical and physical relationships that are known to those skilled in the art, and therefore, are not described in detail. The following is a list of publications discussing these physical and mathematical relationships and are as follows:

1. Rorres, C. and Anton, H., *Applications of Linear Algebra*, (1984), pages 4–6;
2. Friedberg, S. and Insel, A., *Introduction to Linear Algebra with Applications*, (1986), pages 31, 32, 48, 49, 226–234;
3. Shenk, A., *Calculus And Analytic Geometry*, (1977), page 416 subject LoRAN;
4. Stone, D. and Leary J., *Railway Age*, Feb. (1992), "Reinventing The Wheel";
5. McLachlan, P. Eng., *Rail Profiles Can make A Difference*, a paper presented to: American Public Transit Association (1992) Rapid Transit Conference, Los Angeles, Calif., Jun. 16, 1992;
6. Hay, William W., *Railroad Engineering*, Vol 1, pages 47–65;
7. Thomas and Finney, *Calculus and Analytic Geometry*, 5th Ed, (1978), pages 494–496, 7th Ed, pages 559–60; subject is effect off curvature on periodicity per Huygen and his clock;
8. Elsgolts, L., *Differential Equations and Calculus of Variations*, Mir Publishers, Moscow, pages 244–247, subject is stability under constantly operating perturbations;
9. Mayr, Otto, *The Origins of Feedback Control*, (1970), history;
10. Kellogg, Dimon Oliver, *Foundations of Potential*, (1953);
11. Leary, John F., Elkins, John A., *Computer Solutions to Wheel/Rail Interaction Problems*, presented at APTA Jun. 13–17, (1992), flange pressure and other subjects;
12. Murphy, Gordon John, *Basic Automatic Control Theory*, (1957), pages 1–15, 30, 31;
13. Pitman, R. J. G., *Automatic Control Systems Explained*, (1966), good basic mechanical explanation of feedback theory particularly chapter "Inertia and Friction in Control Systems";
14. Ditto, William L. and Pecora, Louis M., *Scientific American*, August (1993), Vol 269, Number 2, "Mastering Chaos";
15. Traub, Joseph F., Wozniakowski, Henryk, *Scientific American*, January (1994), "Breaking Intractability";
16. Schroeder, M. R., *Fractals, Chaos, Power Laws: Minutes From an Infinite Universe*, (1991);
17. Dorf, Richard C., *Modern Control Systems*, (1974) pages 129–131, concept of stability;
18. Magid, Andy R., *Applied Matrix Models: a second course in Linear Algebra with Computer Applications*; (1985), a method of handling over determined systems;
19. Law, E. H, *Transactions of the ASME Journal of Engineering for Industry*, November, (1974) pages 1168–74, "Nonlinear Wheelset Dynamic Responce to Random Lateral Rail Irregularities";
20. Hedrick, J. Karl, Arslan, A. V., *Transactions of the ASME Journal of Dynamic Systems, Measurement, and Control*, Sept, (1979), Vol 101, pages 230–7 "Nonlinear Analysis of Rail Vehicle Forced Lateral Response and Stability";
21. Fries, R. H., Cooperrider, N. K., Law, E. H., *Transactions of the ASME Journal of Dynamic Systems, Measurement, and Control*, Sept, (1981), Vol 103, pages 201–210; "Experimental Investigation of Freight Car Lateral Dynamics";
22. Fries, R. H., Cooperrider, N. K., Law, E. H., *Transactions of the ASME Journal of Dynamic Systems, Measurement, and Control*, December, (1978), Vol 100, pages 238–251.

FIG. 1 is a schematic diagram representing a cross section of a prior art linear tread profile for a wheelset 16. The tread profile for both wheels 18 and 14 comprise a linear conical tread 17 with a downwardly directly flange 19. The wheels 18 and 14 are joined together by an axle 13 that is corresponding connected to train truck (not shown) to support a load. Wheelset 16 is shown in a centered position which is defined as having the flange of wheels 18 and 14 substantially equal distances 26 from rails 22 and 20, respectively. In the centered position, wheels 18 and 14 make contact with rails 22 and 20, respectively at points 24 which are defined as taping lines. A distance 12 exists between taping lines of wheels 18 and 14. Taping line may be contact area of centered travel. Taping line has become defined measuring location rather than center of travel.

FIG. 4 is a schematic showing a top view of the standard linear wheelset 16 in FIG. 1. Referring to both FIGS. 1 and 4, the distance between the taping lines of wheels 14 and 18 in a typical embodiment is approximately 1500 millimeters. The flanges 19 for a single wheelset 16 will contact either rail 20 or 22 when the radius R2 of inside rail 20 is approximately 1074 feet and the radius R1 of outside rail 22 is approximately 1079 feet. This is with 28 inch tires.

When the flanges 19 make contact with the rail, resistance between the flange 19 and the rails 20 and 22 reduce train energy efficiency. More specifically, the flange 19 has approximately a seventy degree inside slope that acts as a wedge when traveling through rails 20 and 22. The wedging action creates wear near the flange 19 that both reduces tire life. The wedging action increases wheel resistance. Wedging action exits in rail curves.

The limit of lateral movement of the wheelset 16 is set by the gauge tolerance of the wheels. The gauge tolerance is defined as the distance between the rail and a given location on a flange fillet area (see FIG. 5). For example, in FIG. 1, the distance 26 between rail 20 and flange 19 defines how far the wheelset 16 can move laterally before flange 19 strikes rail 20. The rails 20 and 22 are not straight and rail curves are not uniform. In addition to the retarding force exerted on the flange 19 when making contact with the rails 20, 22, the force of the rails against the treads 14 and 18 cause the train car on curved or tangent track to zigzag back and fourth from one rail to the other. The zigzag is as much due to change of rail path as to response to rail path. To reduce tire wear and tire/rail resistance, flange pressure must be minimized when there is contact with the rail. The flange contact pressure, however, changes with wear on the tire tread. Thus, in addition to designing the tread profile to simply minimize rail contact, the life cycle of the tread profile must also be considered.

The 'linear' tread profile for the wheelset shown in FIG. 1 does not significantly reduce hunting as will be further explained below, thus, each tread profile has reduced energy efficiently and increased tire wear. Further, the linear profile does not provide adequate steering forces to assist the train around the curved track as described above. Flange contact results in wear and use of energy to overcome friction.

FIG. 2 shows a schematic diagram of a wheelset 28 including wheels 30 each having a tread profile with a first slope 32 and a second slope 34. The increased conicity of slope 34 in relation to slope 32 increases resistive forces that prevent rails 20 and 22 from striking against flanges 36. Thus, the flanges 36 are less likely to make contact with the rails during turns. The problem is that the change between slope 32 and 34 is not continuous. Discontinuous tread profiles do not establish continuous feedback systems that will effectively dampen oscillation as described by Lyapunov. Thus, wheelset 28 will oscillate when sufficient lateral force moves the rail onto slope 34 and further against flange 36. Further, the tread profile shown in FIG. 2 induces increased train vibration when traversing between the two noncontinuous slopes 32 and 34.

FIG. 3 is a schematic diagram showing a wheelset 38 according to the invention. The wheelset 38 includes wheels 39 each comprising mirrored images of an asymptotic curve. A catenary is defined as curve theoretically formed by a perfectly flexible, uniformly dense and thick, inextendable cable suspended from two points. For example, the form of a telephone wire when suspended between two telephone poles. The catenary form of each wheel has the hyperbolic relationship y=cosh x. The relationship in the catenary is formed from the addition of two curves $y=e^{(x/2)}$ and $y=e^{(-x/2)}$.

The catenary can also be defined here as a curve formed from the sum of the mirror images of two continuous asymptotic hyperbolic curves. In the present context, a continuous curve refers to a curve having derivatives that are smooth and continuous. A hyperbola has no harmonics and is aperiodic, in turn, dampening vibration in train tires. The tread profile of wheels 39 are formed of half hyperbolas laid on their sides. The hyperbolic profile is used on opposing tire treads in each wheelset providing an overall wheelset feedback system that dampens tire oscillations. The gradual asymptotic change created by the hyperbolic slope is significant since it effectively produces a recentering correction force in the tread. The recentering forces of the wheelset 38 will be explained in more detail below in FIG. 13.

The invention keeps natural and forced vibration frequencies far apart to minimize oscillation. For example, the natural frequency [Huygen] is defined as the frequency between opposing tires in a wheelset. An example of tire tread with natural frequency is where mirror images of opposing treads add up to catenary cycloid. A forced frequency is the frequency imparted by the guiding rails. The forced frequency depends on train speed and rail path variation. Speed and rail path variations (forced frequencies) continuously change and are, therefore, unknown. However, a range of forced frequencies can be determined.

The natural frequency of the two tires is determined according to tread profile and is, therefore, known. Thus, the natural and forced frequencies are kept far apart by careful choice of the asymptotic tread profile. For example, the natural frequency of the tread profile is selected to have a long aperiodic frequency much longer than the period of the forced frequencies. Thus, the opposing natural and forced frequencies act to dampen as opposed to increase oscillation. This is presented in Vector Mechanics for Engineers by Ferdinand P. Beer and E. Russell Johnston, Jr. 1988, and is herein incorporated by reference.

PROFILE DESIGN

FIG. 5 is an expanded cross section of the asymptotic tread profile 39 previously shown in FIG. 3. The profile 39 is formed at the left end into a flange 50 having a vertical left side 54, a semicircular top 55 and a linear sloping inside face 57. The inside face 57 in a preferred embodiment has an approximately 70 degrees slope that extends to a fillet (transition) section. The transition section extends from point 40 to the beginning of a tread section at point 43. The tread section extends from point 43 to an extreme wear point 47. A field side 53 of profile 39 includes a bevel 52 that extends up to point 51. The different points on the tread profile are defined as follows:

40 defines the beginning of linear inside face 57 of flange 50;

41 transition gauge point located within the transition section;

42 gauge point used as reference point for measuring (flange thickness) distance between the flange and the rail when the tire is in a centered position;

43 first curvature point in the tread section;

44 lift point also referred to as a design point is defined as geometric point used to determine consistent curve to form tread. Lift point gives curve of two opposite tires characteristic of lifting load as absorptive barrier when off center and recentering asymptotically;

45 second curvature point;

46 taping line defined as center position of wheel on rail when wheelset in a center position;

47 extreme wear point is point located as far from flange as normal wear is expected;

48 first reference point within the transition section is point derived from tread formula continues to this point;

49 second reference point within the transition section is point derived from tread formula continued toward fillet.

Points 40, 41, 42, 48, and 49 are located in the fillet section defined as the transition section between the flange 50 and the tread section. Points 43, 44, 45, and 47 are located within the tread section where the tire tread normally makes contact with the rail. However, points 43, 44 and 45 do not contact rails before tread has worn—this is a defining difference from Ziethen. Portions of the wheel to the right of point 47 define a tread transfer section used for supporting the train load during frog and switch crossings. Points 43, 44 and 45 define a minimum accepted tread radius. Points 43, 44 and 45 are a measure of the mismatch of the rail and tire system. That these points not contact rail is thought to be necessary element of tread design. The total width of the profile from the left most side 54 of flange 50 to field side 53 is typically 126 millimeters for narrow tire. The minimum tread radius in a preferred embodiment is not less than the railhead and next to the fillet.

In a first embodiment of the invention, the tread section from point 43 to vicinity of taping line 46 is machined into the shape of a hyperbola. In a second embodiment of the invention, the hyperbolic profile is extended across both the transition section and the tread section from point 40 or 42 to vicinity of taping line 46. In another embodiment, the hyperbola extends over the entire tread section from point 43 to point 47. Thus, in various embodiments of invention various sections of profile 39 contain hyperbolic curvature to increase wheel efficiency. FIG. 5 shows the hyperbolic curve extending completely across the transition section and the tread section from point 40 to point 51.

CALCULATION OF POINTS ON HYPERBOLIC PROFILE

FIG. 6 is an expanded cross section of the profile 39 shown in FIG. 5 showing additional reference points that may be used for deriving the hyperbolic curvature of the tire tread according to the invention. Points 46A and 46B are selected arbitrarily close to point 46 so that a slope can be defined at point 46 by using points 46A and 46B. Points 42A and 42B are selected arbitrarily close to point 42 to define slope at gauge point 42.

Any curve can be used to provide the dampening features of the invention as long as the curve is asymptotic to the rail head. One of the easiest curves to work with is the hyperbola. A hyperbola is represented in equation 1 as follows:

$$Ax^2 + Bxy + Cy^2 + Dx + Ey + F = 0 \quad \text{(Equation 1)};$$

where x is equal to the horizontal distance from the left most vertical line 54 of flange 50 (FIG. 5) and y is equal to the vertical distance from reference point 51 (FIG. 5). A hyperbola is defined as having a discriminate having the following value;

$$B^2 - 4AC > 0.$$

By selecting five separate points on the tread and loading each point into a hyperbolic equation as stated in equation 1, the coefficients A to F are calculated. The coefficients A, B, C, C, E and F are co-factor matrixes. From this information, the correct values for points 43, 44, 45, 46 and 47 containing the tread section are selected to form a hyperbolic profile. Another embodiment of the invention forms a hyperbola from slope values at taping line and the gauge point 42 and finally using lift point 44. The choice of points on the tire tread determine the boundary values. The change of slope in the tread are one boundary value kind. The term boundary value generally means slope at a point boundary.

Boundary values are two things. The first is the slope at a particular point. The second is that the whole asymptotic formula of one profile is a boundary value. The catenary of two treads form final and distinct boundary value. These values give the profiles the characteristic of mismatch between tread and rail, and the additional characteristic of an absorptive boundary. Additional derived characteristics are asymptotic figure and asymptotic reaction.

In a first embodiment of the invention, the formula of "flat" hyperbola does not extend to points lying on the fillet (i.e., to the right of point 44). The flat hyperbola has minimum radius of branch at point 44. The slope between lift point 44 and taping line 46 is a relatively flat hyperbola, therefore, the profile is very asymptotic in the sense of dynamics. This means that the slope does not change very rapidly between taping line and the lift point. That is, there is least amount and consistent amount of damping. The absorptive barrier of two treads resist movement off center of rail with slight resistance to movement. The two treads recenter with slight force when given no opposition. The profile is finished by using points within the transition section to provide a smooth transition from the tread section to the linear sloping section 57 of the flange 50.

The fillet section may have a variety of different selected curvatures. For example, the fillet section can comprise two separate curves comprising points 42A, 42, 42B, 48, and 49 and points 40, 41, 42A, 42, 42B. The curvature of the fillet section is generally chosen as one or two conic curves (may be ellipses). The choice of the five points determine the curve. Alternatively, the fillet section may be contained within the continuous hyperbolic shape of the tread section. This could be done by using only points 40, 42, 44, 46, and 47. Alternately more points could be chosen such that A, B, C, D, E, and F represent variables rather than constants. This is a more complex equation meeting the intent of the invention.

For example, the set of points 40, 42, 44, 46 and 47 must form a test value called discriminate of a hyperbola. This test places a limit of choice of lift point, point 44. This limit is placed on all profiles of this invention. Lift point 44 is less than a critical mismatch threshold. Limits of choice of lift point are defined by FIG. 16. Value for point 44 outside this range do not have the characteristics of this invention.

Points 43, 44 and 45 define a minimum acceptable tread radius. The importance of minimum radius is that said radius needs to be to one side of tangent travel. The location next to flange and fillet makes a consistent and smooth function of tread. Too small of minimum radius may create oscillation. Size of radius also effects useful life of profile. The hyperbolic profile can be limited from taping line 46 to lift point 44 and still provide similar dampening effects. The lift point value should be less than enough to drive two opposing tires side to side. Lift point 44 defines the critical mismatch threshold point between the tread section and rail. Once the lift point is high enough, there is enough stored energy to drive opposite tires side to side in oscillation. This is the critical mismatch of too much lift.

Since the asymptotic profile is also beneficial when used only in limited sections of the tire profile. It is within the context of the invention to use asymptotic curve segments within sections or over the entire tire profile 39 between the gauge point 42 and the field end 53. More mathematically complex profiles can be designed that exhibit similar dampening effects as provided by the hyperbolic curve. As such, FIG. 5 is only one simple representation of present invention.

Figure 7:
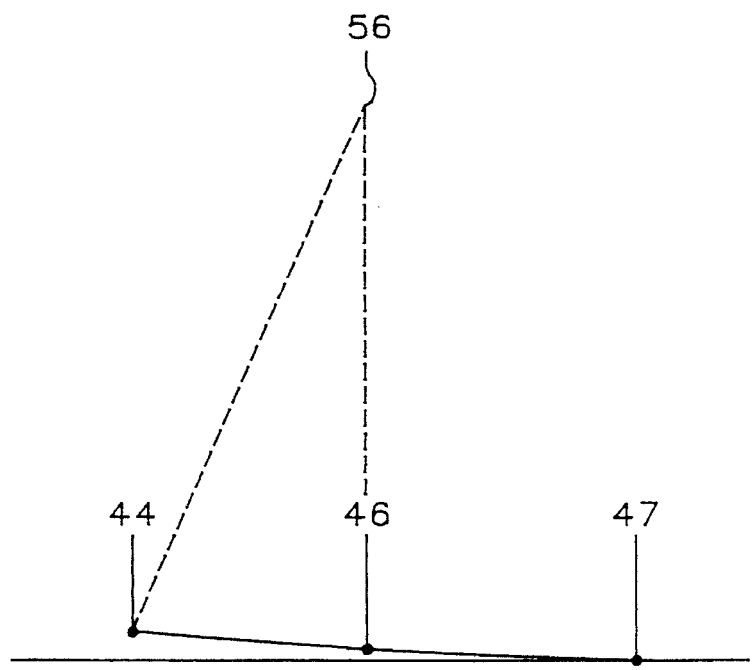
FIG. 7 is part of a prior art a combination of a linear and circular profile taken as an expanded view in the same relative positions of points 44, 46 and 47 in FIG. 5.

FIG. 7 is a partial prior art combination of a circular and linear profile taken as an expanded view in the same relative positions of points 44, 46 and 47 in FIG. 5. The profile segment from point 46 to 47 is a straight line. Line below point 46 is horizontal reference line. Point 56 is a radius point for circle segment that extends from point 44 to point 46. The radius is 350 millimeters. The radii from point 56 to point 44 and from point 56 to point 46 are not to scale. The figure formed by points 56, 46 and 47 is a right triangle. The line from point 46 to 47 is tangent to the arc from point 44 to point 46. The linear/circular profile shown in FIG. 7 is similar to the profile previously shown in Scheffel, for illustrative purposes.

Figure 8:
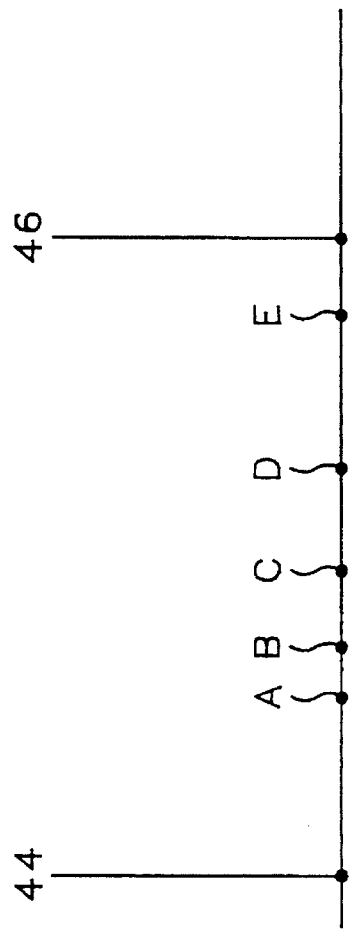
FIG. 8 is a schematic showing a prior art worn linear tread profile.
Figure 9:
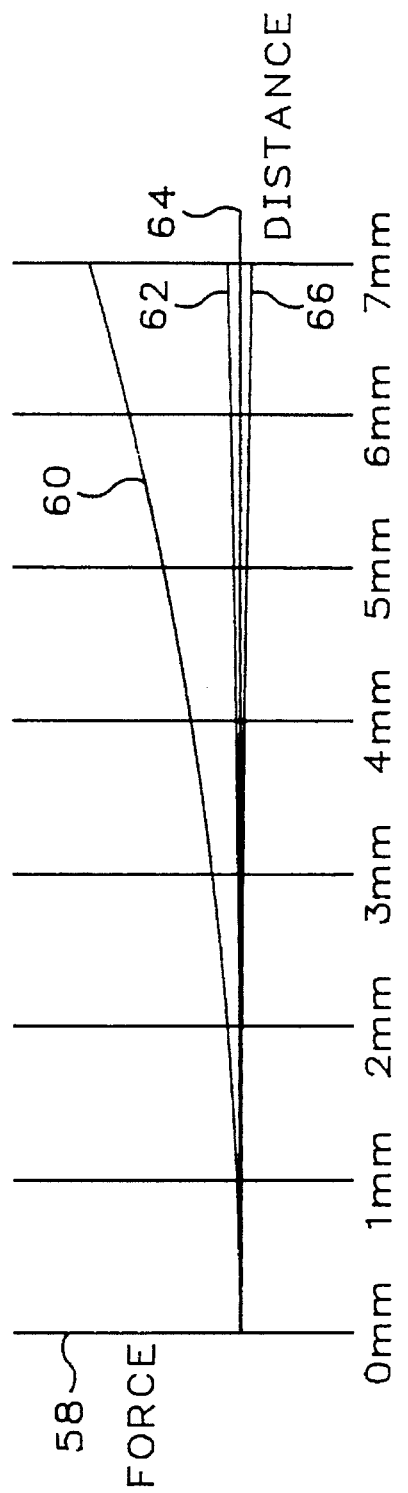
FIG. 9 shows the lift created by different tread profiles of opposing treads on a load.

FIG. 8 comprises five points A to E taken from a worn profile. The points are oriented in an expanded view at the same relative positions of points 44, 46 and 47 in FIG. 5. FIGS. 7 and 8 are shown to illustrate differences in relation to the hyperbolic profile shown in FIG. 5. For example, FIG. 9 shows lift on a train load created by different tire profiles. The lift is measured according to the offset distance of a wheelset from a center position. A vertical center line 58 indicates a zero lateral displacement of a wheel from a predetermined center reference point. The center point is selected at 62.5 millimeters from the far left side of the flange (e.g., side 54 in FIG. 5). Each vertical line to the right of center line 58 is one millimeter of lateral displacement of the wheel away from reference point 58. The vertical scale is expanded fifteen time greater than the horizontal scale.

Line 60 represents the vertical displacement of a load carried on two tires having the circular/linear profile shown in FIG. 7. Line 62 represents the vertical displacement of a load carried on the worn tire profile shown in FIG. 8. Line 64 shows the vertical displacement for a load carried on a set of tires having the hyperbolic profile shown in FIG. 5. Line 66 is a horizontal line used as a reference.

Figure 10:
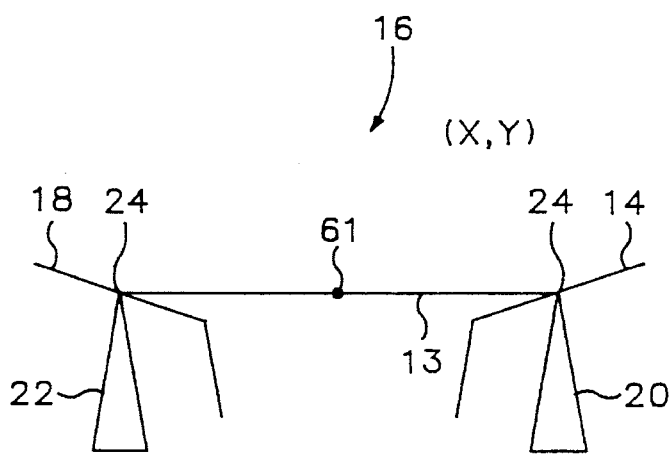
FIG. 10 is a schematic showing a centered wheelset with linear tread profiles.

It can be seen that the profile in FIG. 7, represented by line 60, has significant lift as the wheelset moves further from center line 58. Thus, the wheelset will experience substantial oscillation and vibration. The worn profile shown by line 62 has significantly less vertical lift than the linear/circular profile represented by line 60 but still exhibits more lift than the hyperbolic profile represented by line 64. A lower amount of vertical lift results in less train vibration and increased train stability. For example, FIG. 10 is a front view of the wheelset 16 previously shown in FIG. 1. The wheelset 16 is shown in a centered position between rails 22 and 20. The tread of each wheel 18 and 14 has a completely linear profile. Point 61 is a reference location at the center point of axle 13.

Figure 11:
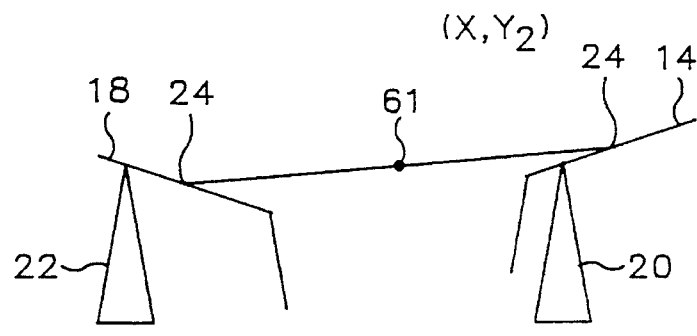
FIG. 11 is the wheelset of FIG. 10 shown in off center position.

In the centered position shown in FIG. 10, the reference location 61 has zero rise (x=0) and zero lateral deflection (y=0). Referring to FIG. 11, the wheelset 16 is offset to the right, for example, when proceeding around a curved section of rail. Because, the tread profile for both wheels 18 and 14 are linear, the vertical rise at the taping line 24 in wheel 14 is substantially equal to the vertical drop at the taping line 24 in wheel 18. Thus, reference point 61 experiences a net horizontal shift (x to x1), but remains at substantially the same vertical position (y=y2). A load on axle 13 of FIG. 1 will, therefore, experience zero net vertical change for relative lateral movements/oscillations of the wheelset relative to the rail.

Even with an essentially zero vertical change, the linear tread still exhibits lateral oscillation. A linear tread profile does not effectively reduce hunting. Steering is achieved as result of feedback. Thus, if the wheelset starts moving laterally back and forth, the load will accordingly move back and forth out of phase with the wheelset. The load then begins to oscillate creating an unstable system. Further, the linear profile in FIG. 10, as mentioned above, does not provide the necessary steering forces to turn in curved track.

A nonlinear profile, such as the profile shown in FIG. 7, provides added steering forces for steering the train around curves. However, a lateral offset in a wheelset having the tire profile shown in FIG. 7, will cause the taping line 24 on one tire to rise a different amount than the corresponding vertical drop in the opposite tire. Thus, the reference point 61 will experience a net vertical rise that raises the load supported on axle 13. The effect is a "push" between the wheelset and the load that creates an oscillation. Since the train also moves laterally back and forth on the rail, a rotational push is effectively transferred to the load. This is the wheelset yaw or rotation about a vertical axis of the wheelset.

Figure 12:
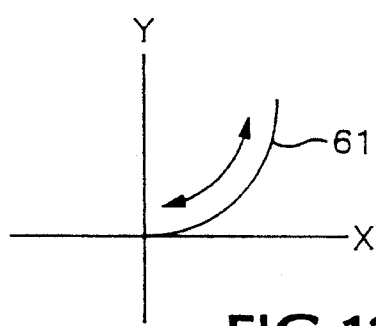
FIG. 12 is a schematic showing the circular displacement of a load due to the linear/circular profile shown n FIG. 7.

FIG. 12 shows a typical rotational oscillation at the reference point 61 for a nonlinear wheel profile. The axle reference point 61, in a centered position, is positioned at the intersection of the x and y axis. As the wheelset moves laterally from the center position, the reference point 61 moves both laterally to the left and rises upward. This resulting circular rotation at the wheelset causes an associated circular rotation in the load supported on axle 61. However, the rotation in the wheelset is out of phase with the resulting rotation in the train load causing oscillation.

The hyperbolic profile of the invention, makes gradual changes in both the vertical and horizontal displacement of the wheels. Thus, the wheelset can wander significantly from a centered position without significantly changing the overall displacement of the load. In other words, an asymptotic tread profile allows large variations in wheel displacements with minimal effective displacement transfer of the associated load. Because, the hyperbolic profile effectively dampens oscillation, even minor changes in the overall wheelset displacement do not result in load oscillation. The asymptotic profile also returns to the initial state asymptotically.

Figure 13:
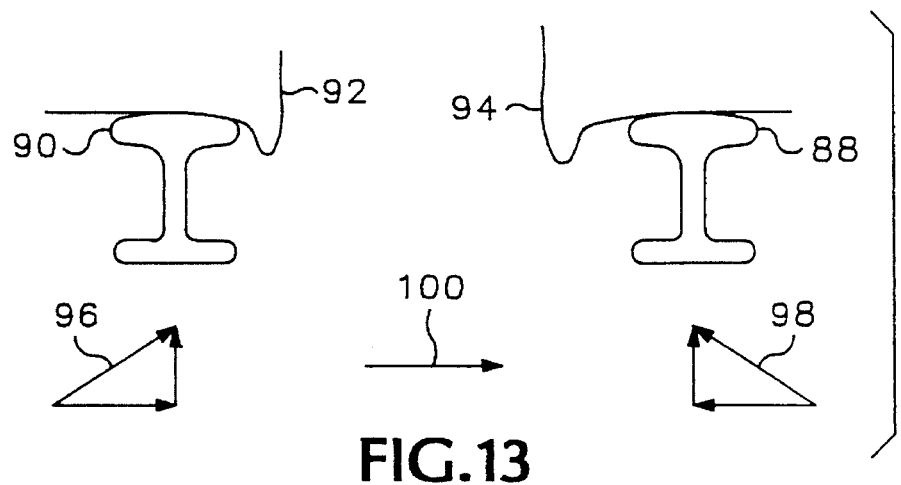
FIG. 13 is a schematic showing the force vectors exerted on a hyperbolic profile by a rail.

The feedback response of the hyperbolic tread profile is also asymmetrical. As a result, increasingly greater lateral and vertical forces are exerted against the wheel when moving laterally toward the flange. However, a proportionally slower decrease in force is exerted as the rail moves laterally toward the field side of the opposite wheel. For example, FIG. 13 shows a left rail 90 and a right rail 88 that support wheels 92 and 94, respectively. The wheelset comprising wheels 92 and 94 are shown laterally offset to the left. Each wheel has a hyperbolic profile according to the present invention.

The left wheel 92 is positioned closer to the flange and, therefore, experiences lateral and vertical vector resistance forces from rail 90 resulting in an overall vector force 96. Alternatively, the flange of wheel 94 is positioned further from the rail than the flange of wheel 92. The vertical and horizontal forces exerted on wheel 94 by rail 88 are combined to exert an overall force 98.

Since the feedback response of the hyperbolic tread profile is asymmetrical, the increase in the overall force vector 96 on wheel 92 is not equal to the decline in the force vector 98 from wheel 94. Specifically, the overall lateral and vertical force (lift) exerted by the rail 90 against wheel 92 increases as the wheelset moves laterally toward the wheel flange. Thus, the tread profile provides more correction as the wheelset moves further from a centered position. The combination of lateral and vertical forces against the wheel decrease as the wheelset moves back into a centered position with the flanges away from the rail. Thus, a net force 100 is directed toward wheel 92 forcing the wheelset to the right back into a centered position.

Since the asymptotic profile is asymmetric, there is a given amount of lift upon lateral displacement, as shown by line 64 in FIG. 9. However, the vertical lift is small to reduce circular vibrational effects. The two opposite tires 90 and 94 are also designed to have local minima when located in a centered position between two rails. Local minima in the present context is defined as the location where the load exhibit the lowest potential energy of gravity. Thus, when wheels 92 and 94 are in a centered position, the corresponding load is at its lowest point in relation to the ground.

Traditional profiles, such as shown in FIG. 1, have a linear profile that does not effectively reduce hunting. As a result, the wheel flanges come in frequent contact with the rail increasing/localizing tread wear near the flange. This results in traditional tread profiles exhibiting more wear next to the flange than on field side of the wheel. Gauge variation of rails spread wear out on field side of tread. The flange localizes wear to itself. The tread profile according to the invention, however, spreads wheel to rail contact back toward centered contact thus reducing tread wear next to the flange. The asymptotic profile tends to take the shortest distance relative to the rail. Thus there is less tread wear due to less distance traveled by treads on rail.

Figure 14:
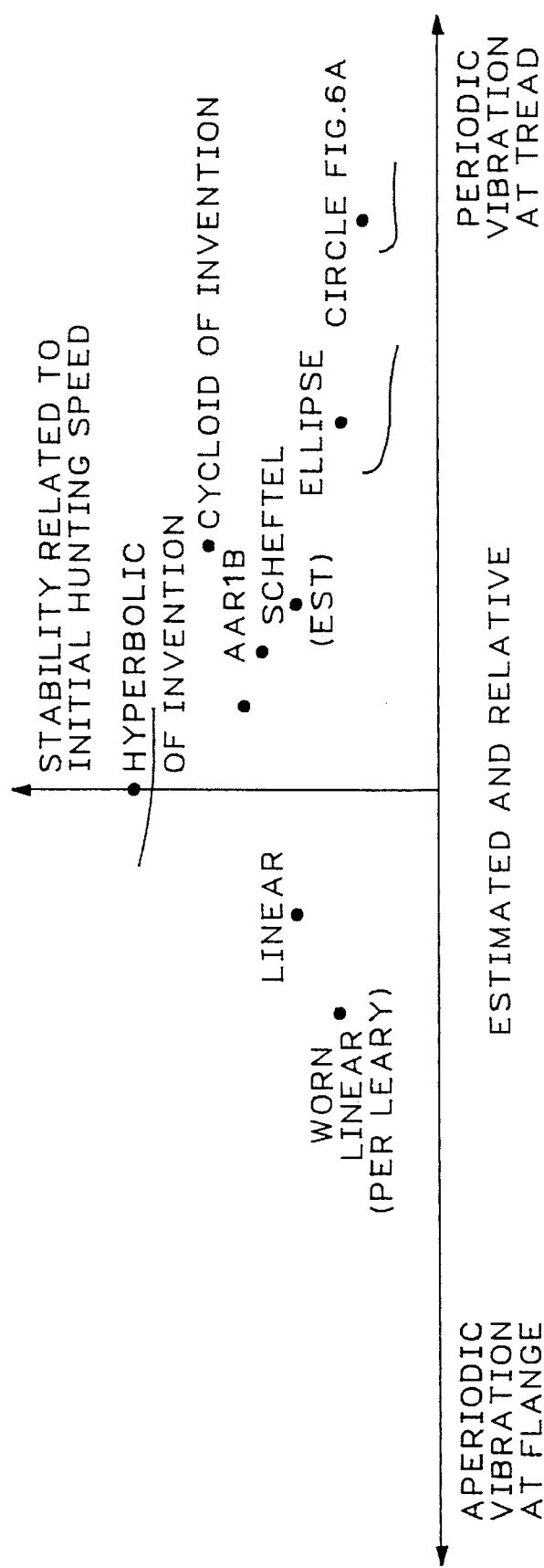
FIG. 14 is a graph showing a relationship between the stability of different tire profiles according to curve periodicity.

FIG. 14 is a graph showing a relationship between the stability of different tire profiles according to curve periodicity. Completely aperiodic profiles such as a worn liner profile or a linear profile are incompletely effective at reducing lateral vibration thus, resulting in significant flange contact and lateral oscillation as described above. Highly periodic profiles such as a circle or ellipse will exhibit circular vibration at the tread resulting in circular oscillation. The hyperbolic profile of the invention, however, exhibits both aperiodic and periodic characteristics. The aperiodic characteristic is not induced vibration. The periodic characteristic is an increased curving ability. That is increased curving ability with higher induced hunting speed. Thus, the hyperbolic profile has increased stability over present profile shapes.

Figure 15:
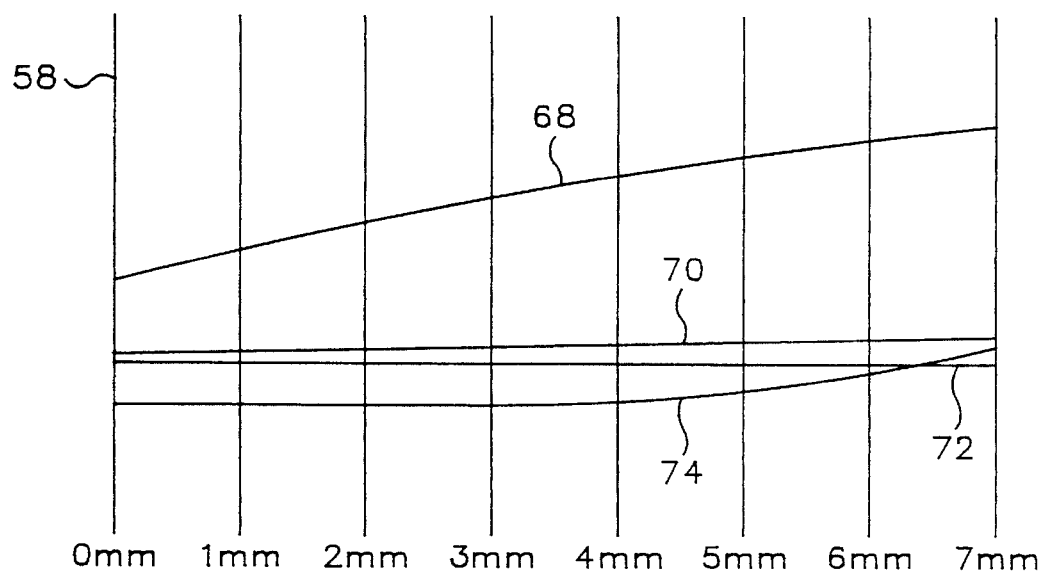
FIG. 15 is a graph showing the steering forces of several tire profiles.

FIG. 15 is a graph showing the steering forces of several tire profiles. Vertical center line 58 is the same as center line 58 in FIG. 9 and each vertical line to the right of line 58 represents a displacement of 1 millimeter from a center wheelset position. The steering force is a product of the vertical (lift) vector and the change in slope in the tread at a given wheelset offset from the centered position. Line 68 represents the steering force for the linear/circular profile shown in FIG. 7. Line 70 represents the steering forces for the hyperbolic profile according to the invention. Line 72 represents the steering forces for a profile having a linear slope of 1:30. The linear slope of line 72 has a constant value of 0.0333. This is one divided by thirty. That number has no units. Line 74 represents the steering forces for the worn profile shown in FIG. 7.

From FIG. 15 it can be seen that the steering forces of the hyperbolic curve in line 70 are substantially constant with lateral displacement. Thus, there is no sudden change of steering force with induced oscillation. Relative movement of rail is damped by profile either partially ignoring change or restoring centered position. Relative movement from centered position is resisted with almost constant but slightly increasing force.

Figure 16:
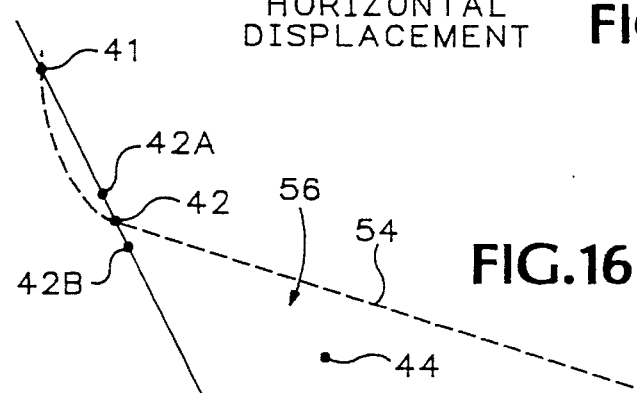
FIG. 16 shows boundary limits of critical mismatch threshold where tread of hyperbolic form is an absorption boundary.

FIG. 16 defines limits of choice of point 44 to form a continuous absorptive barrier of a hyperbolic tire profile. The asymptotic profile in the present invention effectively creates an absorptive barrier having a continuous surface curvature. Noncontinuous curvatures create new barrier limits that can induce oscillation. Absorptive barriers are described as absorbing barriers for the random walk in a problem in Linear Algebra Basics Practice and Theory by Bernard R. Gelbaum 1989 Elsevier Science Publishing Company on page 546 and is herein incorporated by reference.

The limit of choice for point 42 is only herein termed absorption boundary. In other words, choice of point outside boundary of figure in FIG. 16 results in other than asymptotic response.

The absorption boundary extends from gauge point 42 to the taping line 46 (FIG. 5). Lift point 44 according to the invention is located somewhere within the absorption boundary 56. A profile extending above line 54 is essentially an ellipse. Thus, a profile having a lift point above curve 54 will have a negative discriminate and, in turn, induces the periodic circular oscillation inherent in elliptical profiles. Negative discriminate indicates a hollow profile. Line/curve 54 defines a parabola with a discriminate of zero. Curve 54 is upper bound for choice of point 44. A profile taken along line 58 is of course linear and, therefore, exhibits the oscillation effects discussed above.

When the design of the tire profile uses point 44 within absorption barrier 56, an asymptotic profile is formed. Wear is distributed over the entire profile. The result is that the wheel is more durable and performs better over a longer period. Point 44 chosen closer to line 58 is more aperiodic. Point chosen closer to curve 56 is more periodic.

Figure 17:
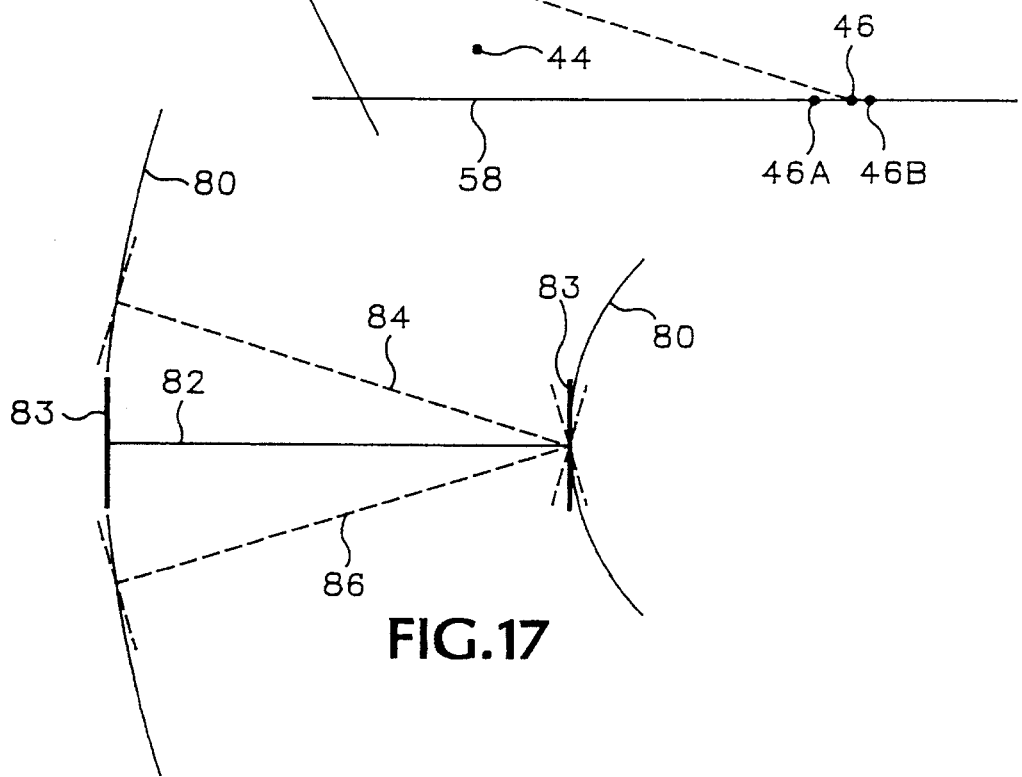
FIG. 17 is a schematic showing the phase angles for a wheelset traveling through a curved track section.

In FIG. 17 the direction of rolling is toward axle 84. Axle 82 is a tangent response. Axle 84 leads a tangent response. Axle 86 lags a tangent response. Leading a tangent response results in oscillation. Since feedback mechanisms tend to oscillate, attempting to maintain exactly a tangent response results in oscillation. Consequently, the best axle position is one that slightly lags a tangent response. It is also important to note that the combined profiles of each wheelset provide a phase angle that lags a tangent response. Phase angle is important in the relationship between the storage of kinetic energy as potential energy of gravity. This is a source of energy that could result in oscillation. Due to the profile of the tread, the amount of potential energy stored by the train wheel exhibits a lag in phase angle in relation to the tangent response. The phase angle lags so that the least amount of energy is stored by the wheel. There is less resultant oscillation.

To explain further, FIG. 17 shows the relationship between the opposing asymptotically profiled tires 83. For example, a train track 80 is rounded in a semicircular fashion. A wheelset when in position 82 is traveling in a tangent orientation in relation to track 80 is said to have a zero phase angle. When the left tire 83 is dropped back from the tangent position 82 to position 86, the wheelset has a lagging or negative phase angle. When left tire of the wheelset leads the right wheel as shown in position 84, the wheelset has a positive or leading phase angle.

A hyperbolic profile exhibits a negative phase angle similar to wheelset 86 and, therefore, allows the load to move laterally with corresponding lateral movements of the wheels. Thus, the lagging phase response of the asymptotic profiled wheelset dampens the lateral oscillation of the load. A positive phase angle, on the other hand, causes oscillation as the wheelset seeks an equilibrium state such as shown by wheelset 82.

The lagging wheelset response happens to have the lowest potential energy of the three response modes. Specifically, the potential energy stored in raised wheelset must not be large enough to overcome the frictional forces between the rail and tire. By making the stored kinetic energy have an asymptotic response, absorptive damping is exhibited in the wheel in addition to the normal frictional damping provided by a straight conical tread profile.

The profile according to the invention can not correct for defects in machining accuracy, incorrectly configured rail, incorrectly configured vehicle or vehicles that operate too rapidly for existing conditions. Inventor assumes no liability for such cases and assumes no liability for unlicensed attempts to use product.

Having described and illustrated the principles of the invention in a preferred embodiment thereof, it should be apparent that the invention can be modified in arrangement and detail without departing from such principles. Further, use of word asymptotic profile is inclusive of term hyperbolic form. The application is not just to trains, but all railed devices including manufacturing processes. I claim all modifications and variation coming within the spirit and scope of the following claims.

1. A profile for a train wheel, comprising:
   a flange section having a protuberance for extending over an edge of a rail;
   a fillet section extending from field side surface of the flange; and
   a tread section extending from the fillet section toward a field side of the train wheel, the tread section including a lift point adjacent to the fillet section, a taping line and a wear point and having a continuous asymptotic profile between the lift (design) point and the taping line including an asymptotically increasing radius that increases continuously from the lift point toward the taping line thereby causing the train wheel to respond asymptotically to changes in direction.

2. A profile according to claim 1 wherein the continuous asymptotic profile extends at least partially between the taping line and the extreme wear point.

3. A profile according to claim 1 wherein the continuous asymptotic profile extends at least partially across the fillet section.

4. A profile according to claim 1 wherein the asymptotic profile comprises a continuous asymptotic curve that extends from the fillet section to the wear point.

5. A profile according to claim 4 wherein at least a portion of the fillet section includes a profile having an elliptical curvature.

6. A profile according to claim 1 wherein the lift point comprises minimum radius on the tread section.

7. A profile according to claim 4 including a tread transfer section, the asymptotic profile extending continuously through the wear point in the tread section to a field side of the wheel.

8. A profile for a train wheel according to claim 1 wherein the curvature of the asymptotic profile is defined by a given expression:

$$Ax^2+Bxy+Cy^2+Dx+Ey+F=0;$$

where x is equal to a horizontal distance for every point on the tread measured from a given reference point and y is equal to a vertical distance for every point from said reference point; and wherein a discriminate value for the given expression for every point has the following value:

$$B^2-4AC>0.$$

9. A train wheelset for a train rail, comprising:
   a first wheel and a second wheel, each wheel having a flange section, a fillet section and a tread section, the first and second wheel each having a field side oriented in opposite directions on the train rail; and
   the tread section for the first and second wheel each having a continuous asymptotic curvature with a radius that increases continuously toward the field side for creating a feedback response between the first and second wheels that responds asymptotically to lateral movement of the first and second wheel on the train rail.

10. A train wheelset according to claim 9 wherein the the curvature of the asymptotic profile is defined by a given expression:

$$Ax^2+Bxy+Cy^2+Dx+Ey+F=0;$$

where x is equal to a horizontal distance for every point on the tread section measured from a given reference point and y is equal to a vertical distance for every point from said reference point; and wherein a discriminate value for the given expression for every point has the following value:

$$B^2-4AC>0.$$

11. A train wheelset according to claim 10 wherein the tread profile comprises a machined asymptotic outline.

12. A train wheelset according to claim 9 wherein the first and second wheel tread have hyperbolic profiles that form opposite mirrored sections of catenary, the tire profiles operating in conjunction to provide asymmetric resistance to lateral displacement of the wheelset in relation to the train rail.

13. A train wheelset according to claim 12 wherein the first and second wheels have a natural frequency substantially longer than a forced frequency exerted by the rail against the wheels.

14. A train wheelset according to claim 9 wherein a local minima for a load supported by the first and second wheels exists when the first and second wheels align in a centered position between the rails.

15. A train wheelset according to claim 9 wherein the first and second wheels exert a phase lag in relation to a load supported by said wheels when traversing about a curved rail.

16. A method for forming a profile on a train wheel having a flange section, a fillet section extending from the flange, a tread section extending from the fillet section and a transfer section, the tread section having a lift (design) point adjacent to the fillet section, a center taping line and a wear point adjacent to the transfer section, the method for forming the train wheel profile comprising the following steps:
   selecting a reference point in relation to the train wheel;
   identifying five points on the tread section;
   selecting each of the five points that satisfy a given equation as follows:

$$Ax^2+Bxy+Cy^2+Dx+Ey+F=0;$$

where x is equal to a horizontal distance for each of the selected points from the reference point and y is equal to a vertical distance for each of the selected points form the reference point;

selecting the five points such that a discriminate value for the given equation has the following value:

$$B^2-4AC>0;\text{ and}$$

forming the tread section to intersect each of the five points on the tread section thereby forming a tread profile having a continuous hyperbolic curvature.

17. A method according to claim 15 including selecting the five points such that the radius of the hyperbolic curvature increases toward the taping line and a given minimum radius of the hyperbolic curvature is located adjacent to the fillet section.

18. A method according to claim 17 including selecting the five points such that a given minimum radius of the hyperbolic curvature is located on the fillet.

19. A method according to claim 16 wherein every location on the tread section and portions of locations on the fillet section and transfer section satisfy the given expression and discriminate value.

* * * * *